Patented July 28, 1953

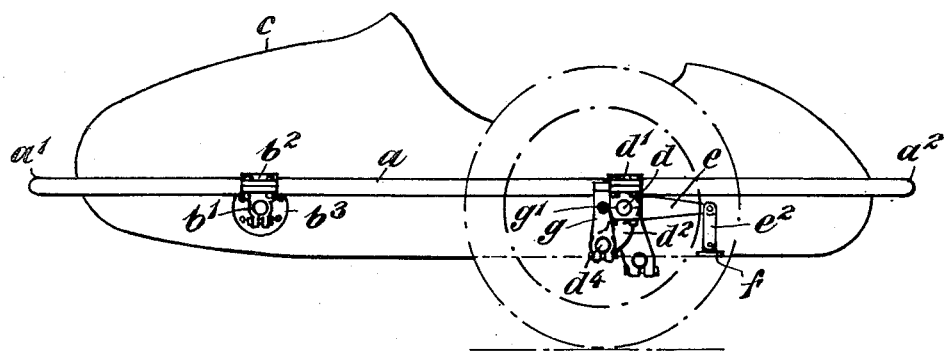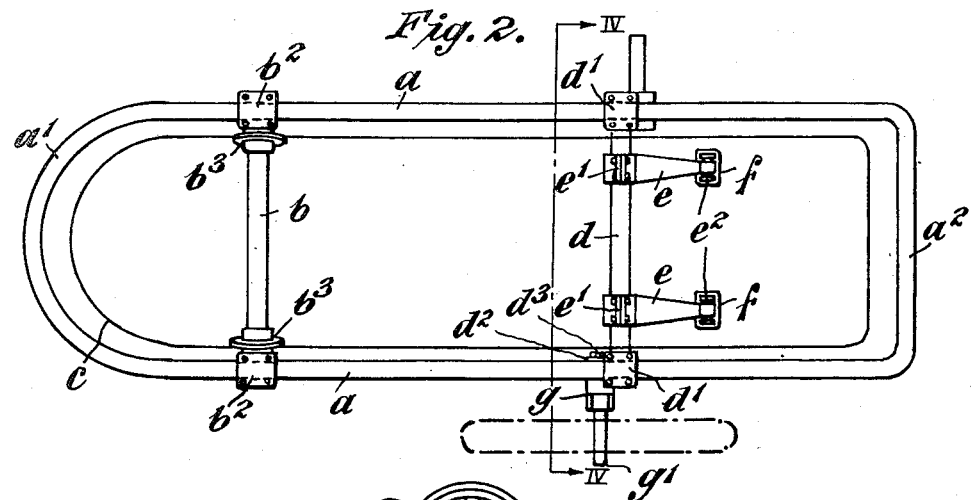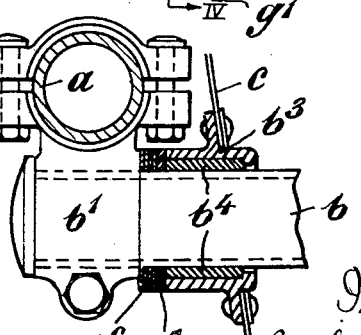

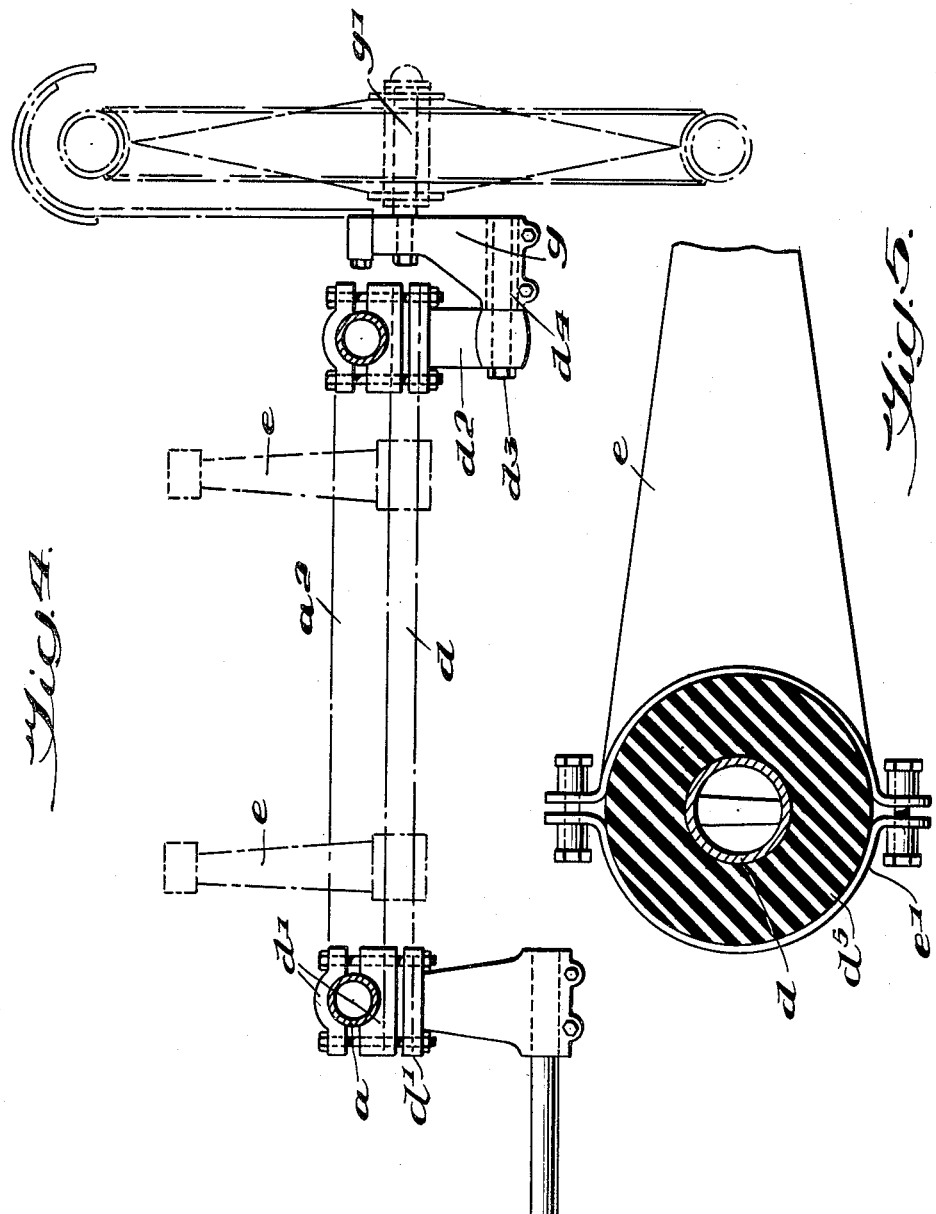

2,646,992

UNITED STATES PATENT OFFICE 2,646,992

SIDECAR FOR MOTORCYCLES

Nicholas Straussler, Piccadilly, London, England, assignor to Swallow Coachbuilding Company (1935) Limited, Walsall, Stafford, England Application September 27, 1949, Serial No. 118,000
In Great Britain October 12, 1948

4 Claims. (Cl. 280—203)

The present invention has relation to sidecars for motorcycles and has particular reference to the resilient mounting of the body upon the chassis by the advantageous use of bonded rubber unions which permit the efficient operation of the body in relation to the chassis and at the same time provide a maximum degree of stability and comfort to the user.

According to the present invention there is provided a sidecar comprising a peripheral frame wherein or whereon the sidecar body is resiliently mounted forwardly by means of a fixed pivot preferably of a resilient character and rearwardly by two or more levers or radius arms which are pivotally connected at complementary extremities to a transverse member of the chassis by bonded rubber and are connected at their remote extremities by shackles or links to the sidecar body. the said shackles or links permitting the true restricted oscillatory movement of the body on the fixed pivot at the fore-part of the chassis.

In order that this invention may be clearly understood and readily carried into practice, reference may be had to the appended explanatory drawings, upon which:

Fig. 1 illustrates the sidecar with chassis and body in side elevation.

Fig. 2 illustrates the chassis and body in plan view.

Fig. 3 is a fragmentary elevation of the fixed forward pivot of the body.

Fig. 4 is a front view taken on the line 4—4 of Fig. 2, and

Fig. 5 is a detail cross sectional view of the connection between the rear tube $d$ and levers $e$.

In a convenient embodiment of the present invention the chassis is constructed from a length of tubing which is bent to form two parallel side members $a$, a curved or semi-circular section $a^1$ at the front and a straight transverse section $a^2$ at the rear radiused into the side members. At the forepart of this frame, which is disposed in a horizontal plane, there is provided a transverse tube $b$ secured by split lugs $b^1b^2$ to the side members $a$ (see particularly Fig. 3). $b^3$ are flanged annuli to which the sidecar body $c$ is attached and $b^4$ is a rubber cushion with a separate flange $b^5$ positioned adjacent to an end thereof. Rubber cushion $b^4$ is bonded to transverse tube $b$ and to each of the flanged annuli $b^3$. $b^6$ represents a plurality of spacing washers positioned between flange $b^5$ and split lugs $b^1$ and $b^2$. The sidecar body at its front therefore has a true resilient pivot on the tube $b$. At or towards the rear part of the chassis there is provided a transverse tube $d$ disposed immediately beneath the chassis tubing $a$ and connected thereto by appropriate split lugs $d^1$. Mounted upon this transverse tube are two levers or radius arms $e$ which extend rearwardly and substantially horizontally, the connection between the levers or radius arms $e$ and transverse tube $d$ each involving a bonded rubber bushing $d^5$ which is similar in character to the aforedescribed rubber cushion $b^4$ so that the movement of the levers or radius arms is flexibly controlled. The levers or radius arms $e$ may be adjustable as to inclination by virtue of split lugs $d^1$ and split clamping members indicated generally by reference numeral $e^1$ and are enclosed with their limbs in the sidecar body.

A plate $f$ is attached to the bottom part of the body $c$ of the vehicle and this plate is provided with a lug which is shackled to the rearward extremities of the levers or radius arms $e$ by pairs of links $e^2$ disposed normally in vertical position.

With the present construction therefore the sidecar body $a$ pivots upon its forward pivot $b$ and is controlled at its rear by the bonded levers or radius arms $e$, the shackles or links $e^2$ permitting the true oscillatory movement of the body on the forward pivot.

The split lugs $d^1$, which carry the transverse tube $d$ whereon levers $e$ are mounted, may be provided with a downwardly projecting arm $d^2$ which carries a spindle $d^3$ having a bonded rubber bushing $d^4$ which in turn carries an upwardly directed arm $g$ carrying the wheel spindle $g^1$. The wheel spindle $g^1$ rocks on its rubber bearing $d^4$.

I claim:

1. A sidecar comprising a frame member having two substantially parallel side members and two end members, a sidecar body, fore and rearwardly positioned transverse members supported by said side members and extending between said side members, a pivotal connection between said fore positioned transverse member and said sidecar body, and a resilient suspension between said rearwardly positioned transverse member and said sidecar body comprising a plurality of levers, one end of each of said levers being resiliently secured to said rearwardly positioned transverse member by a rubber bushing bonded to said member and to said lever, said levers extending rearwardly in a substantially horizontal direction, and shackle means connected between the sidecar body and the other ends of said levers.

2. A sidecar comprising a frame member having two substantially parallel side members, a sidecar body, fore and rearwardly positioned transverse members supported by said side members, a pivotal connection between said fore positioned transverse member and said sidecar body, a suspension between said rearwardly positioned transverse member and said sidecar body comprising a plurality of substantially horizontally disposed levers having one end of each of said levers pivotally connected to said rearwardly positioned transverse member and the other ends shackled to said sidecar body, a downwardly projecting arm supported by one of said side members, an upwardly directed arm upon which is mounted a wheel spindle, and resilient securing means pivotally connected to said aforesaid arms comprising a rubber bushing bonded to each of said arms.

3. A sidecar comprising a frame member having two substantially parallel side members and two end members, a sidecar body, fore and rearwardly positioned transverse members supported by said side members and extending between said side members, a resilient pivotal connection between said fore positioned transverse member and the sides of said sidecar body, and a resilient suspension between said rearwardly positioned transverse member and said sidecar body comprising a plurality of levers, one end of each of said levers being resiliently secured to said rearwardly positioned transverse member by a rubber bushing bonded to said member and to said lever, said levers extending rearwardly in a substantially horizontal direction, and shackle means connected between the sidecar body and the other ends of said levers.

4. A sidecar comprising a frame member having two substantially parallel side members and two end members, a sidecar body, fore and rearwardly positioned transverse members supported by said side members and extending between said side members, a pivotal connection between said fore positioned transverse member and said sidecar body, and a resilient suspension between said rearwardly positioned transverse member and said sidecar body comprising a plurality of levers, one end of each of said levers being resiliently secured to said rearwardly positioned transverse member by a rubber bushing bonded to said member and to said lever, said levers extending rearwardly in a substantially horizontal direction, and shackle means connected between the sidecar body and the other ends of said levers, said levers and said shackle being positioned within said sidecar body.

NICHOLAS STRAUSSLER.

References Cited in the file of this patent

UNITED STATES PATENTS

| Number | Name | Date |
| --- | --- | --- |
| 2,409,501 | Krotz | Oct. 15, 1946 |

FOREIGN PATENTS

| Number | Country | Date |
| --- | --- | --- |
| 142,294 | Austria | June 25, 1935 |
| 152,012 | Austria | Dec. 27, 1937 |
| 152,036 | Austria | Dec. 27, 1937 |
| 485,077 | Great Britain | May 13, 1938 |
| 625,624 | Great Britain | June 30, 1949 |
| 652,083 | Germany | Oct. 25, 1937 |